United States Patent
Ling et al.

(10) Patent No.: US 9,634,754 B2
(45) Date of Patent: *Apr. 25, 2017

(54) METHOD AND SYSTEM FOR AN INTERNET PROTOCOL LNB SUPPORTING POSITIONING

(71) Applicant: MaxLinear, Inc., Carlsbad, CA (US)

(72) Inventors: Curtis Ling, Carlsbad, CA (US); Timothy Gallagher, Encinitas, CA (US); Glenn Chang, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,902

(22) Filed: Apr. 26, 2016

(65) Prior Publication Data

US 2016/0269863 A1 Sep. 15, 2016

Related U.S. Application Data

(63) Continuation of application No. 14/256,355, filed on Apr. 18, 2014, now Pat. No. 9,326,101, which is a
(Continued)

(51) Int. Cl.
*H04N 21/41* (2011.01)
*H04N 21/643* (2011.01)
(Continued)

(52) U.S. Cl.
CPC .......... *H04B 7/18526* (2013.01); *G01S 19/42* (2013.01); *H04B 7/185* (2013.01);
(Continued)

(58) Field of Classification Search
CPC .......... H04N 21/4524; H04N 21/6193; H04N 21/6143; H04N 21/25841; H04N 21/4126;
(Continued)

(56) References Cited

U.S. PATENT DOCUMENTS 5,708,963 A * 1/1998 Mobley .................. H04N 7/20
725/68
7,784,070 B2 8/2010 Chang et al.
(Continued)

OTHER PUBLICATIONS

Int'l Search Report and Written Opinion for PCT/US13/24976 dated Apr. 19, 2013, 30 pages.
SAT>IP Protocol Specification V 1.1, SES SA., British Sky Broadcasting Ltd Nov. 12, 2011.

*Primary Examiner* — Hai V Tran
(74) *Attorney, Agent, or Firm* — McAndrews, Held & Malloy, Ltd.

(57) ABSTRACT

An Internet protocol low noise block downconverter (IP LNB), which may be within a satellite reception assembly, may be operable to determine location information and time information of the IP LNB, and may communicate the determined location information and the corresponding time information to a wireless communication device communicatively coupled to the IP LNB. The communicated location information may be configured to enable the wireless communication device to determine its location based on the determined location information and the corresponding time information. The IP LNB may determine the location information and/or the time information of the IP LNB based on global navigation satellite system (GNSS) signals, which may be received via the satellite reception assembly and may be processed via the IP LNB. The IP LNB may provide services based on the determined location information and/or the determined time information of the IP LNB.

18 Claims, 8 Drawing Sheets

Related U.S. Application Data continuation of application No. 14/080,418, filed on Nov. 14, 2013, now Pat. No. 8,707,371, which is a continuation of application No. 13/687,742, filed on Nov. 28, 2012, now Pat. No. 8,615,780.

(60) Provisional application No. 61/595,654, filed on Feb. 6, 2012.

(51) Int. Cl.

| | |
|---|---|
| H04N 21/4363 | (2011.01) |
| H04N 21/4405 | (2011.01) |
| H04N 21/45 | (2011.01) |
| H04N 21/61 | (2011.01) |
| H04W 4/02 | (2009.01) |
| H04B 7/185 | (2006.01) |
| H04W 84/10 | (2009.01) |
| H04H 40/90 | (2008.01) |
| H04H 20/08 | (2008.01) |
| H04N 21/434 | (2011.01) |
| H04N 21/438 | (2011.01) |
| H04N 21/4408 | (2011.01) |
| H04N 21/441 | (2011.01) |
| H04N 21/4627 | (2011.01) |
| H04J 4/00 | (2006.01) |
| H04W 76/04 | (2009.01) |
| H04L 12/741 | (2013.01) |
| H04L 29/12 | (2006.01) |
| H04W 84/04 | (2009.01) |
| H04W 88/08 | (2009.01) |
| H04W 88/16 | (2009.01) |
| G01S 19/42 | (2010.01) |
| H04L 29/06 | (2006.01) |
| H04H 60/21 | (2008.01) |
| H04H 60/23 | (2008.01) |
| H04W 84/12 | (2009.01) |

(52) U.S. Cl.
CPC ..... *H04B 7/18515* (2013.01); *H04B 7/18517* (2013.01); *H04B 7/18523* (2013.01); *H04H 20/08* (2013.01); *H04H 40/90* (2013.01); *H04J 4/00* (2013.01); *H04L 45/74* (2013.01); *H04L 61/2007* (2013.01); *H04L 65/4076* (2013.01); *H04N 21/4126* (2013.01); *H04N 21/4343* (2013.01); *H04N 21/4382* (2013.01); *H04N 21/43637* (2013.01); *H04N 21/441* (2013.01); *H04N 21/4405* (2013.01); *H04N 21/4408* (2013.01); *H04N 21/4524* (2013.01); *H04N 21/4627* (2013.01); *H04N 21/61* (2013.01); *H04N 21/6143* (2013.01); *H04N 21/6193* (2013.01); *H04N 21/64322* (2013.01); *H04W 4/023* (2013.01); *H04W 76/04* (2013.01); *H04W 84/042* (2013.01); *H04W 84/10* (2013.01); *H04W 88/08* (2013.01); *H04W 88/16* (2013.01); *H04H 60/21* (2013.01); *H04H 60/23* (2013.01); *H04W 84/12* (2013.01)

(58) Field of Classification Search
CPC ......... H04N 21/43637; H04N 21/4405; H04N 21/61; H04N 21/64322; H04H 40/90; H04H 60/42; H04H 60/51; H04B 7/18571; H04W 48/16; H04W 4/023
See application file for complete search history.

(56) References Cited

U.S. PATENT DOCUMENTS

| | | |
|---|---|---|
| 8,087,057 B2 | 12/2011 | Minnick |
| 8,095,466 B2 | 1/2012 | Kahn et al. |
| 2002/0023010 A1* | 2/2002 | Rittmaster .......... G06F 17/3087 705/26.1 |
| 2004/0033795 A1* | 2/2004 | Walsh .................. G01S 5/0009 455/404.1 |
| 2004/0093614 A1 | 5/2004 | Sakurai et al. |
| 2006/0282862 A1 | 12/2006 | Dew et al. |
| 2011/0200024 A1 | 8/2011 | Karaoguz et al. |
| 2011/0267229 A1 | 11/2011 | Gayrard et al. |
| 2012/0163290 A1* | 6/2012 | Krafft ................ H04B 7/18582 370/316 |
| 2012/0297414 A1 | 11/2012 | Sprague et al. |
| 2012/0297415 A1 | 11/2012 | Sprague et al. |
| 2012/0297426 A1 | 11/2012 | Ling et al. |
| 2012/0297427 A1 | 11/2012 | Chang et al. |
| 2013/0205328 A1 | 8/2013 | Ling et al. |
| 2013/0205350 A1 | 8/2013 | Ling et al. |

* cited by examiner

METHOD AND SYSTEM FOR AN INTERNET PROTOCOL LNB SUPPORTING POSITIONING

CROSS-REFERENCE TO RELATED APPLICATIONS/INCORPORATION BY REFERENCE

This patent application is a continuation of U.S. patent application Ser. No. 14/256,355, filed Apr. 18, 2014, which is a continuation of U.S. patent application Ser. No. 14/080, 418, filed Nov. 14, 2013, which is a continuation of U.S. patent application Ser. No. 13/687,742, filed Nov. 28, 2012, which in turn makes reference to, claims priority to, and claims benefit from U.S. Provisional Application Ser. No. 61/595,654, which was filed on Feb. 6, 2012.

This application also makes reference to:
U.S. patent application Ser. No. 13/326,125 filed on Dec. 14, 2011;
U.S. patent application Ser. No. 13/596,852 filed Aug. 28, 2012;
U.S. patent application Ser. No. 13/715,250 filed Dec. 14, 2012;
U.S. patent application Ser. No. 13/687,626 filed Nov. 28, 2012; and
U.S. patent application Ser. No. 13/687,676 filed Nov. 28, 2012.

Each of the above stated applications is hereby incorporated herein by reference in its entirety.

FIELD OF THE INVENTION

Certain embodiments of the invention relate to communication systems. More specifically, certain embodiments of the invention relate to a method and system for an Internet protocol LNB supporting positioning.

BACKGROUND OF THE INVENTION

A satellite television system may comprise a low noise block downconverter (LNB), which is generally co-located with a satellite dish in the satellite television system. The conventional LNB may be operable to amplify a received radio frequency (RF) satellite signal and convert such signal to lower frequencies such as, for example, intermediate frequencies (IF). Presently, satellite television systems have become ubiquitous, primarily due to reductions in the cost of satellite television reception technology. A plurality of satellite television systems may be in a neighborhood.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for an Internet protocol LNB supporting positioning, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
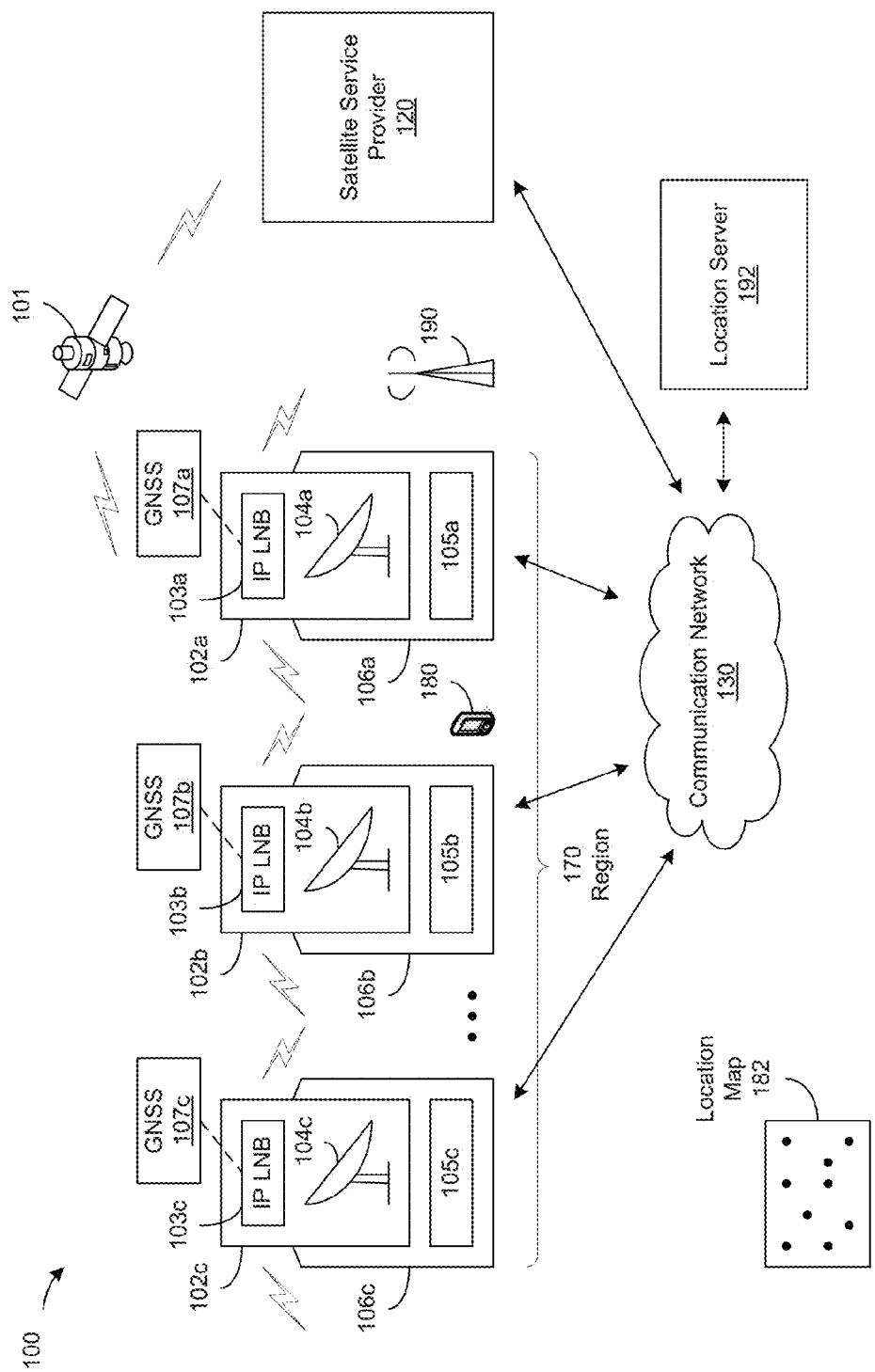
FIG. 1 is a block diagram illustrating an exemplary communication system, in accordance with an embodiment of the invention.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. Certain embodiments of the invention can be found in a method and system for an Internet protocol LNB supporting positioning. In various embodiments of the invention, an Internet protocol low noise block downconverter (IP LNB) assembly, which is within a satellite reception assembly, may be operable to determine location information and/or time information of the IP LNB assembly. The IP LNB assembly may be operable to provide services based on the determined location information and/or the determined time information of the IP LNB assembly. In this regard, the IP LNB assembly may determine the location information and/or the time information of the IP LNB assembly via, for example, a global navigation satellite system (GNSS) module in the IP LNB assembly.

In an exemplary embodiment of the invention, the IP LNB assembly may be operable to communicate the determined location information and/or the determined time information to a wireless communication device, which may be communicatively coupled to the IP LNB assembly. In such instances, the wireless communication device may determine location information of the wireless communication device, based on the location information and the time information communicated from the IP LNB assembly and other location information and corresponding other time information communicated from one or more other IP LNB assemblies. In this regard, the wireless communication device may also be communicatively coupled to the one or more other IP LNB assemblies. The IP LNB assembly may be operable to receive the location information of the wireless communication device from the wireless communication device. The received location information of the wireless communication device may then be stored in the IP LNB assembly, for example.

In an exemplary embodiment of the invention, the IP LNB assembly may be operable to perform digital rights management (DRM) and/or conditional access (CA) for content delivery based on the determined location information of the IP LNB assembly. The determined time information of the IP LNB assembly may be communicated, by the IP LNB assembly, to one or more other IP LNB assemblies in a region for accurate timing recovery for the region. Based on the determined location information of the IP LNB assembly along with other location information associated with other IP LNB assemblies in a region, a location map may be generated by the IP LNB assembly for the region. Based on the determined location information of the IP LNB assembly, relocation of the satellite reception assembly and/or an associated gateway may be detected by the IP LNB assembly.

In an exemplary embodiment of the invention, the IP LNB assembly may be operable to determine location information of a wireless source device based on the determined location information and the determined time information of the IP LNB assembly along with a plurality of other location information and a plurality of corresponding other time information associated with a plurality of other IP LNB assemblies. In this regard, the plurality of other IP LNB assemblies may be communicatively coupled to the IP LNB assembly. The time information and each of the other time information may be determined based on receiving a corresponding signal from the wireless source device. The IP LNB assembly may determine the location information of the wireless source device locally and/or remotely via a location server, for example. The determined location information of the wireless source device along with other characteristics of the wireless source device may be stored in a database in the IP LNB assembly, for example. A third party may utilize the determined location information in real-time or at some later time (e.g. via a log), in order to verify the position or location of the wireless source device. This may be useful for secure transactions, user identification, conditional access, estimating traffic and its flow, delivering precise and timely location-based information and services, and/or other types of transactions.

FIG. 1 is a block diagram illustrating an exemplary communication system, in accordance with an embodiment of the invention. Referring to FIG. 1, there is shown a communication system 100. The communication system 100 may comprise a satellite 101, a satellite service provider 120, a communication network 130, a location server 192 and a plurality of premises, of which the premises 106a-106c are illustrated. The premises 106a-106c may be, for example, houses, multi-dwelling units or offices. The premises 106a may comprise a satellite reception assembly 102a and a gateway 105a. The satellite reception assembly 102a may comprise an IP LNB assembly 103a and a dish 104a. The IP LNB assembly 103a may comprise a GNSS module 107a. The premises 106b may comprise a satellite reception assembly 102b and a gateway 105b. The satellite reception assembly 102b may comprise an IP LNB assembly 103b and a dish 104b. The IP LNB assembly 103b may comprise a GNSS module 107b. The premises 106c may comprise a satellite reception assembly 102c and a gateway 105c. The satellite reception assembly 102c may comprise an IP LNB assembly 103c and a dish 104c. The IP LNB assembly 103c may comprise a GNSS module 107c.

In the exemplary embodiment of the invention illustrated in FIG. 1, a satellite reception assembly such as the satellite reception assembly 102a is shown as a satellite dish assembly, which comprises a dish such as the dish 104a. Notwithstanding, the satellite reception assembly may not be so limited. For example, a satellite reception assembly may comprise a planar or parabolic array of antenna elements and/or receiver circuitry whose signals are combined for satellite signal reception.

The satellite service provider 120 may comprise suitable logic, circuitry, interfaces and/or code that may be operable to communicate in various satellite bands. The satellite service provider 120 may provide satellite television services to the plurality of premises 106a-106c via the satellite 101. The satellite service provider 120 may also be referred to as a satellite headend.

A satellite reception assembly such as the satellite reception assembly 102a may receive satellite signals from the satellite 101 via the dish 104a. The IP LNB assembly 103a in the satellite reception assembly 102a may process the received satellite signals and communicate the processed signals or data to the gateway 105a. The IP LNB assembly 103a may communicate the processed signals to the gateway 105a via, for example, one or more cables such as coaxial cables.

An IP LNB assembly such as the IP LNB assembly 103a may comprise suitable logic, circuitry, interfaces and/or code that may be operable to process the received satellite signals. The IP LNB assembly 103a may be operable to downconvert the received satellite signals, channelize the downconverted signals, demodulate the channelized signals and convert the demodulated or recovered signals to digitized packets such as Internet protocol (IP) packets.

In an exemplary embodiment of the invention, the IP LNB assembly 103a may comprise one or more sensors which may be integrated within or coupled to the IP LNB assembly 103a. The IP LNB assembly 103a may comprise a wireless interface module which may provide, for example, cellular, femtocell, picocell, WiMax and/or WiFi interfaces. For example, the IP LNB assembly 103a may provide connectivity with a wireless communication device such as the wireless communication device 180 via the wireless interface module. The IP LNB assembly 103a may interconnect, via the wireless interface module, with other IP LNB assemblies such as the IP LNB assemblies 103b-103c within the proximity of a neighborhood to establish a mesh network in a region such as the region 170. The IP LNB assembly 103a may comprise one or more antennas which may be integrated within or coupled to the wireless interface module. A plurality of antenna elements may be arranged as an antenna array. The IP LNB assembly 103a may comprise a wired interface module which may provide connectivity with the gateway 105a. The IP LNB assembly 103a may comprise a routing module. The routing module may be operable to route bandwidth among the satellite 101, the wireless interface module and the wired interface module. For example, the routing module may route satellite video content to destinations accessed through the wireless interface module and/or the wired interface module. The IP LNB assembly 103a may comprise the global navigation satellite system (GNSS) module 107a. For example, the GNSS module 107a may comprise a global positioning system (GPS) unit.

A gateway such as the gateway 105a may comprise suitable logic, circuitry, interfaces and/or code that may be operable to process satellite data received from the IP LNB assembly 103a and output the data to an end-user device such as a television in the premises 106a. The gateway 105a may be operable to perform reception, processing and/or transmission of signals or data. The gateway 105a may communicate signals or data to and/or from among the IP LNB assembly 103a, the communication network 130 and/or a local area network (LAN) in the premises 106a. The gateway 105a may also be referred to as a receiver, a set-top box (STB) or a cable modem.

The communication network 130 may comprise suitable logic, circuitry, interfaces, devices and/or code that may be operable to provide wide area network (WAN) services via various communication technologies such as, for example, DOCSIS, DSL, Carrier Ethernet, ATM, Frame Relay, ISDN, x.25 and/or other suitable WAN technology. For example, the communication network 130 may comprise an Internet network. In an exemplary embodiment of the invention, the communication network 130 may provide communication services to the premises 106a-106c and/or the satellite service provider 120.

The location server 192 may comprise suitable logic, circuitry, interfaces and/or code that may be operable to receive data associated with a wireless source device such as the wireless source device 190 from one or more IP LNB assemblies such as the IP LNB assemblies 103a, 103b, 103c. The location server 190 may be operable to process the received data to determine location information of the wireless source device 190. In an exemplary embodiment of the invention, the location server 190 may be operable to perform trilateration or triangulation processing on the received data to determine the location information of the wireless source device 190. The determined location information of the wireless source device 190 may be communicated to an IP LNB assembly such as the IP LNB assembly 103a for storage in a database, for example.

In operation, the IP LNB assembly 103a, which is within the satellite reception assembly 102a, may be operable to determine location information and/or time information of the IP LNB assembly 103a via, for example, the GNSS module 107a in the IP LNB assembly 103a. The IP LNB assembly 103a may be operable to provide services based on the determined location information and/or the determined time information of the IP LNB assembly 103a.

The IP LNB assembly 103a may be operable to communicate the determined location information and/or the determined time information to a wireless communication device such as the wireless communication device 180 which may be communicatively coupled to the IP LNB assembly 103a. The wireless communication device 180 may comprise, for example, a mobile phone, a smart phone, a tablet, a laptop and/or the like device. In such instances, the wireless communication device 180 may determine location information of the wireless communication device 180, based on the location information and the time information communicated from the IP LNB assembly 103a and other location information and corresponding other time information communicated from one or more other IP LNB assemblies such as the IP LNB assemblies 103b, 103c. In this regard, the wireless communication device 180 may also be communicatively coupled to the one or more other IP LNB assemblies 103b, 103c. As one, two, or more other IP LNB assemblies may be available to participate in the determination of the location information of the wireless communication device 180, more accurate location estimates may be obtained. The IP LNB assembly 103a may be operable to receive the location information of the wireless communication device 180 from the wireless communication device 180. The received location information of the wireless communication device 180 may then be stored in the IP LNB assembly 103a, for example. The stored location information of the wireless communication device 180 may be, for example, communicated to and utilized by other IP LNB assemblies 103b, 103c in the region 170. For example, the location information of the wireless communication device 180 may be utilized by the IP LNB assembly 103b to determine whether the wireless communication device 180 is within certain proximity or range of the IP LNB assembly 103b.

The IP LNB assembly 103a may be operable to perform digital rights management (DRM) and/or conditional access (CA) for content delivery based on the determined location information of the IP LNB assembly 103a. The determined time information of the IP LNB assembly 103a may be communicated, by the IP LNB assembly 103a, to one or more other IP LNB assemblies 103b, 103c in the region 170 for accurate timing recovery for the region 170. Accurate timing may be propagated throughout an IP LNB network in the region 170, for example. Based on the determined location information of the IP LNB assembly 103a along with other location information associated with other IP LNB assemblies 103b, 103c in the region 170, a location map or grid such as the location map 182 may be generated by the IP LNB assembly 103a for the region 170. Based on the determined location information of the IP LNB assembly 103a, relocation or move of the satellite reception assembly 102a and/or the associated gateway or receiver 105a may be detected by the IP LNB assembly 103a.

The IP LNB assembly 103a may be operable to determine location information of a wireless source device such as the wireless source device 190 based on the determined location information and the determined time information of the IP LNB assembly 103a, along with a plurality of other location information and a plurality of corresponding other time information associated with a plurality of other IP LNB assemblies 103b, 103c. In this regard, the plurality of other IP LNB assemblies 103b, 103c may be communicatively coupled to the IP LNB assembly 103a. The time information and each of the other time information may be determined based on receiving a corresponding signal from the wireless source device 190. The wireless source device 190 may comprise, for example, a WiFi transmitter, a wireless access point, a hotspot and/or other similar type of device. The IP LNB assembly 103a may determine the location information of the wireless source device 190 locally and/or remotely via the location server 192, for example. The determined location information of the wireless source device 190 along with other characteristics of the wireless source device 190 may be stored and maintained in a database in the IP LNB assembly 103a, for example. The other characteristics may comprise, for example, unprotected WiFi status, frequency offset, transmission frequency, estimated power levels, etc. In this regard, the database may comprise location information and other characteristics information associated with a plurality of wireless source devices. The database may then be made available to others, for example, for the purposes of determining nearby hotspots positioning, time synchronization, hand-off, frequency allocation, frequency planning, and/or coverage planning and analysis.

Figure 2:
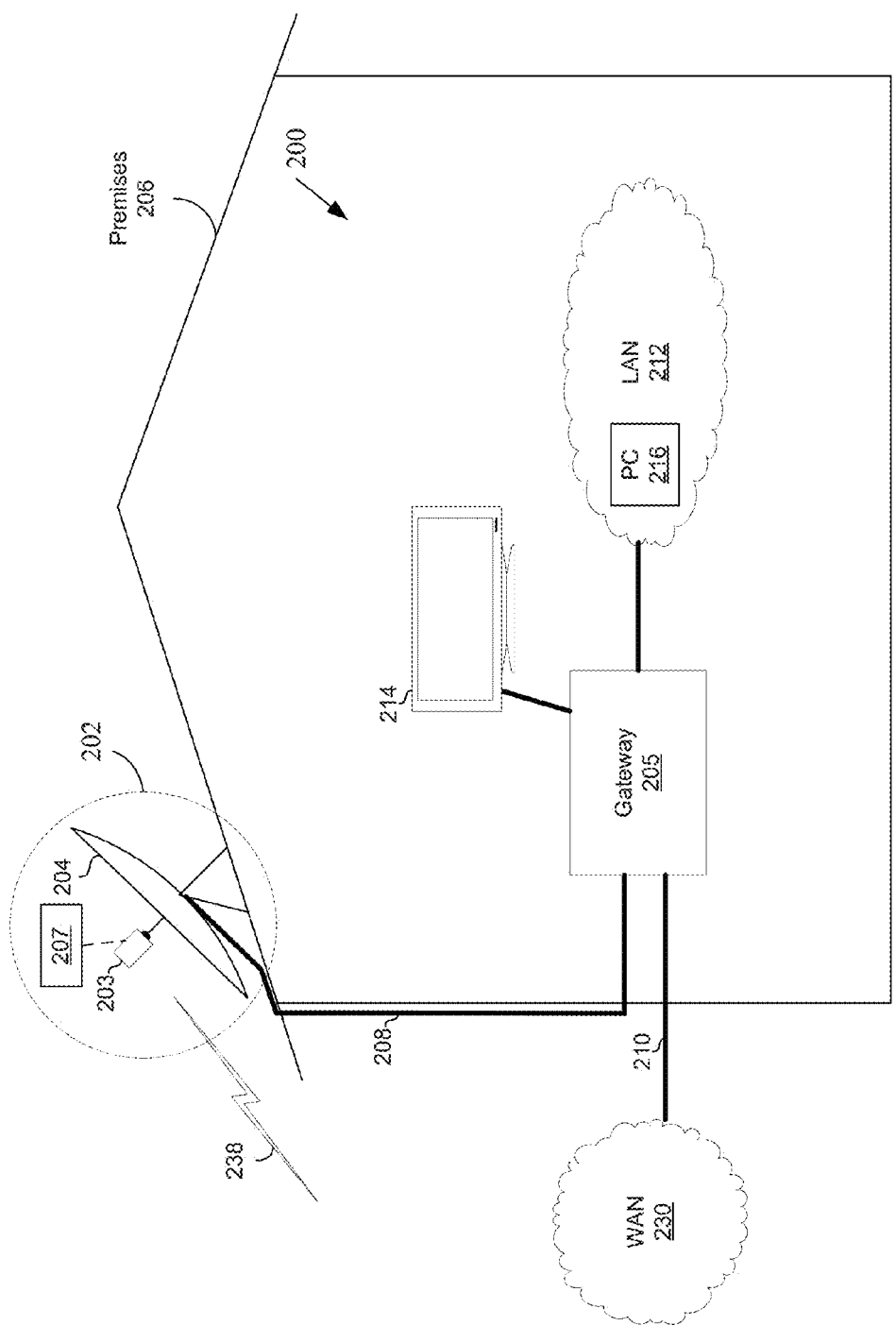
FIG. 2 is a block diagram illustrating an exemplary satellite television system, in accordance with an embodiment of the invention.

FIG. 2 is a block diagram illustrating an exemplary satellite television system, in accordance with an embodiment of the invention. Referring to FIG. 2, there is shown an in-premises network 200 that is located within the premises 206, a satellite reception assembly 202 and a wide area network (WAN) 230. The satellite reception assembly 202 may comprise an IP LNB assembly 203 and, for example, a dish 204. The IP LNB assembly 203 may comprise a GNSS module 207. There is also shown a wireless link 238, a network link 208 connecting the satellite reception assembly 203 and the in-premises network 200, a network link 110 connecting the in-premises network 200 and the WAN 230. The exemplary in-premises network 200 may comprise a gateway 205, a television 214 and a local area network (LAN) 212.

The premises 206 may be substantially the same as the premises 106a described with respect to FIG. 1, for example. The satellite reception assembly 202 may be substantially the same as the satellite reception assembly 102a described with respect to FIG. 1. The dish 204 may be substantially the same as the dish 104a described with respect to FIG. 1. The IP LNB assembly 203 may be substantially the same as the IP LNB assembly 103a described with respect to FIG. 1. The GNSS module 207 may be substantially the same as the GNSS module 107a described with respect to FIG. 1, for example. The gateway 205 may be substantially the same as the gateway 105a described with respect to FIG. 1, for example. The WAN 230 may be substantially the same as the communication network 130 described with respect to FIG. 1, for example.

The wireless link 238 may provide wireless connectivity with a wireless communication device such as the wireless communication device 180. The IP LNB assembly 203 may interconnect, via the wireless link 238, with other IP LNB assemblies such as the IP LNB assemblies 103b, 103c within the proximity of a neighborhood. Each of the network links 208 and 210 may comprise one or more wired, wireless and/or optical links. The network link 208 may comprise, for example, a coaxial cable and/or a 60 GHz wireless link which carries physical layer symbols in accordance with, for example, multimedia over coax alliance (MoCA) or Ethernet standards. The network link 210 may comprise, for example, a coaxial cable or Cat 6 cable which carries physical layer symbols in accordance with, for example, DSL or Ethernet standards.

The television 214 may comprise suitable logic, circuitry, interfaces and/or code that may be operable to receive media and control data via one or more point-to-point media links (e.g., HDMI), process the received data and to recover audio and/or video, and present the audio and/or video to a user.

The LAN 212 may comprise suitable logic, circuitry, interfaces, devices and/or code that may be operable to provide network services within the premises 206. Devices such as, for example, a PC 216 in the LAN 212 may communicate utilizing, for example, MoCA, IEEE 802.11 and/or Ethernet protocols.

In operation, the dish 204 may receive one or more satellite television signals, each of which may be comprised of one or more channels. The signals may be processed by the IP LNB assembly 203 to recover one or more of the channels carried in the received signals. The processing of the received satellite signals by the IP LNB assembly 203 may comprise downconverting the received satellite signals, channelizing the downconverted signals, demodulating the channelized signals and converting the demodulated or recovered signals to digitized packets such as Internet protocol (IP) packets. The processed signals or data may be communicated from the IP LNB assembly 203 to the gateway 205 via the network link 208. The gateway 205 may then process the received signals or data for distribution to the television 214 and/or to an end-user device such as the PC 216 in the LAN 212. The gateway 205 may also be operable to route the received signals or data to the WAN 230 via the network link 210. The IP LNB assembly 203 may also communicate processed signals or data to a wireless communication device such as the wireless communication device 180 or an IP LNB assembly such as the IP LNB assembly 103b or the IP LNB assembly 103c within the proximity of a neighborhood, via the wireless link 238.

The IP LNB assembly 203 may be operable to determine location information and/or time information via, for example, the GNSS module 207. The determined location information and/or the determined time information may be communicated by the IP LNB assembly 203 to the wireless communication device 180 via, for example, the wireless link 238 for determining a location information of the wireless communication device 180. The determined location information and/or the determined time information may also be communicated to one or more other IP LNB assemblies such as the IP LNB assemblies 103b, 103c in a region such as the region 170 via, for example, the wireless link 238 and/or via the network links 208, 210. The communicated time information may be utilized for accurate timing recovery for the region 170, for example. The IP LNB assembly 203 may be operable to receive signals from a wireless source device such as the wireless source device 190 via, for example, the wireless link 238.

Figure 3:
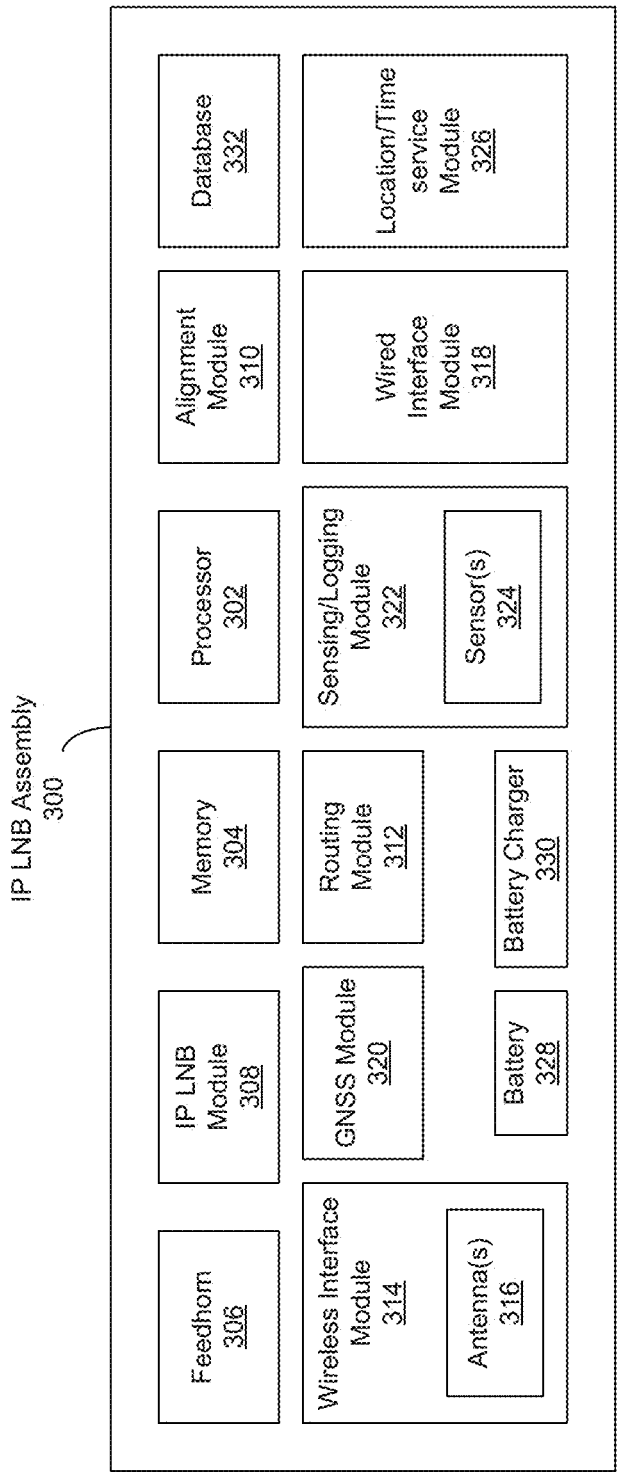
FIG. 3 is a block diagram illustrating an exemplary Internet protocol LNB assembly, in accordance with an embodiment of the invention.

FIG. 3 is a block diagram illustrating an exemplary Internet protocol LNB assembly, in accordance with an embodiment of the invention. Referring to FIG. 3, there is shown an IP LNB assembly 300. The IP LNB assembly 300 may be substantially the same as the IP LNB assembly 203 described with respect to FIG. 2 and the IP LNB assembly 103a described with respect to FIG. 1, for example. The IP LNB assembly 300 may comprise a processor 302, a memory 304, a feedhorn 306, an IP LNB module 308, an alignment module 310, a routing module 312, a wireless interface module 314, a wired interface module 318, a GNSS module 320, a sensing/logging module 322, a location/time service module 326, a database 332, a backup battery 328 and a battery charger 330. The wireless interface module 314 may comprise one or more antennas 316. The sensing/logging module 322 may comprise one or more sensors 324.

The processor 302 may comprise suitable logic, circuitry, interfaces and/or code that may be operable to manage and/or control operations of various components and/or modules in the IP LNB assembly 300. The processor 302 may utilize an operating system that enables the execution of various applications.

The memory 304 may comprise suitable logic, circuitry, interfaces and/or code that may be operable to store information such as executable instructions and/or data that may be utilized by the processor 302 and/or other modules or components in the IP LNB assembly 300. The memory 304 may comprise RAM, ROM, low latency nonvolatile memory such as flash memory and/or other suitable electronic data storage.

The feedhorn 306 may comprise suitable logic, circuitry, interfaces and/or code that may be operable to gather satellite signals which may be received from a satellite such as the satellite 101 via a satellite dish such as the dish 204. The feedhorn 306 may direct the gathered satellite signals to the IP LNB module 308 for processing.

The IP LNB module 308 may comprise suitable logic, circuitry, interfaces and/or code that may be operable to process the satellite signals gathered by the feedhorn 306. The IP LNB module 308 may be operable to downconvert the received satellite signals, channelize the downconverted signals, demodulate the channelized signals and convert the demodulated or recovered signals to digitized data such as IP packets. The IP LNB module 308 may process the signals employing one or more full-spectrum capture (FSC) receivers, which digitize the downconverted signals, in the IP LNB module 308. There may be instances when one or more of all FSC links are not being utilized for processing satellite signals. In such instances, the unused FSC link(s) may be repurposed by the IP LNB module 308 to process or handle terrestrial information. For example, a repurposed FSC link may be utilized to process and/or transport WiFi traffic, cellular traffic, terrestrial TV traffic, etc. A repurposed FSC link may be dynamically repurposed back to its original LNB functionality as needed.

A repurposed FSC link may be utilized, for example, to process a signal received, via the wireless interface module 314, from a wireless source device such as the wireless source device 190. During processing of the signal received from the wireless source device 190, a time of arrival of the received signal may be estimated based on time information provided by the GNSS module 320. The estimated time of arrival of the received signal along with time stamp information in the received signal may be utilized by the location/time service module 326 for determining location information of the wireless source device 190, for example.

The alignment module 310 may comprise suitable logic, circuitry, interfaces and/or code that may be operable to perform alignment functions for the IP LNB assembly 300 and/or the dish 204. In an exemplary embodiment of the invention, the alignment module 310 may comprise MEMS or piezo electric devices.

The routing module 312 may comprise suitable logic, circuitry, interfaces and/or code that may be operable to selectively route data and/or signals among the IP LNB module 308, the wireless interface module 314 and the wired interface module 318. The routing may be based on IP addresses, TCP/UDP port numbers, packet identifiers (PIDs), stream identifiers and/or any other suitable field or information. For example, the routing module 312 may route satellite video content to end-user devices accessed through the wireless interface module 318 and/or the wired interface module 318.

The wireless interface module 314 may comprise suitable logic, circuitry, interfaces and/or code that may be operable to establish one or more wireless connections, such as the wireless link 238, with one or more wireless communication devices such as the wireless communication device 180. The connections may utilize any suitable wireless protocol(s) such as, for example, cellular, femtocell, picocell, WiMax and/or WiFi. In an exemplary embodiment of the invention, the wireless interface module 314 may be implemented as a small-cell basestation such as, for example, a femtocell or a picocell basesatation. The wireless interface module 314 may be operable to receive signals from one or more wireless source devices such as the wireless source device 190. The wireless interface module 314 may comprise one or more antennas 316. The antenna(s) 316 may be integrated within or coupled to the IP LNB assembly 300. The antenna(s) 316 may be arranged as an antenna array.

The wired interface module 318 may comprise suitable logic, circuitry, interfaces and/or code that may be operable to communicate data via one or more cables such as the network link 208 with a gateway such as the gateway 205. For example, the wired interface module 318 may be operable to output, via the cable(s), the signals or data received from the IP LNB module 308 to the gateway 205. The wired interface module 318 may be able to communicate over the cable(s) utilizing Ethernet, MoCA and/or any other suitable protocol(s).

The GNSS module 320 may comprise suitable logic, circuitry, interfaces and/or code that may be operable to detect and receive GNSS signals or data from one or more GNSS satellites. The GNSS module 320 may be operable to generate location information and/or time information associated with the IP LNB assembly 300.

The sensing/logging module 322 may comprise suitable logic, circuitry, interfaces and/or code that may be operable to collect information received from one or more sensors 324. The sensor(s) 324 may be integrated within or coupled to the IP LNB assembly 300. The sensing/logging module 322 may store the collected information received from the sensor(s) 324. In an exemplary embodiment of the invention, the sensor(s) 324 may comprise, for example, an atmospheric sensor, a camera, a motion sensor and/or a directional sensor. The atmospheric sensor may provide weather related information such as, for example, temperature, humidity, barometric pressure, wind speed and/or precipitation. The camera may also be referred to as an optical CMOS sensor, for example. The directional sensor may comprise, for example, a 3D axis compass and/or a 3D axis gyroscope.

The location/time service module 326 may comprise suitable logic, circuitry, interfaces and/or code that may be operable to provide location service and/or time service functions for the IP LNB assembly 300.

The database 332 may comprise suitable logic, circuitry, interfaces and/or code that may be operable to store and maintain location information and/or other characteristics information associated with one or more wireless source devices such as, for example, the wireless source device 190. The location information may be determined or computed by the location/time service module 326. The other characteristics information, which may comprise, for example, frequency offset, transmission frequency, estimate power levels, etc., may be communicated from the IP LNB module 308.

The backup battery 328 may be operable to provide backup power to the IP LNB assembly 300 in instances when the IP LNB assembly 300 loses AC power. The battery charger 330 may comprise circuitry that may be operable to keep the backup battery 328 charged.

In operation, the processor 302 may be operable to determine location information and/or time information of the IP LNB assembly 300 via, for example, the GNSS module 320. The determined location information and/or the determined time information may be utilized by the location/time service module 326 for providing services to other devices.

The IP LNB assembly 300 may be operable to communicate the determined location information and/or the determined time information to a wireless communication device such as the wireless communication device 180 via, for example, the wireless interface module 314. In such instances, the wireless communication device 180 may determine location information of the wireless communication device 180, based on the location information and the time information communicated from the IP LNB assembly 300 and a plurality of other location information and corresponding other time information communicated from a plurality of other IP LNB assemblies such as the IP LNB assemblies 103b, 103c. The IP LNB assembly 300 may be operable to receive the location information of the wireless communication device 180 from the wireless communication device 180 via, for example, the wireless interface module 314. The received location information of the wireless communication device 180 may then be stored in the memory 304, for example. The stored location information of the wireless communication device 180 may be communicated to and utilized by other IP LNB assemblies 103b, 103c in a region such as the region 170, for example.

The location/time service module 326 may be operable to perform digital rights management (DRM) and/or conditional access (CA) for content delivery based on the determined location information of the IP LNB assembly 300. The determined time information of the IP LNB assembly 300 may be communicated via, for example, the wireless interface module 314 and/or via the wired interface module 318, to one or more other IP LNB assemblies 103b, 103c in the region 170 for accurate timing recovery for the region 170. Based on the determined location information of the IP LNB assembly 300 along with other location information associated with other IP LNB assemblies 103b, 103c in the region 170, a location map or grid such as the location map 182 may be generated by the location/time service module 326 for the region 170. Based on the determined location information of the IP LNB assembly 300, relocation or move of an associated satellite reception assembly such as the satellite reception assembly 202 and/or an associated gateway such as the gateway or receiver 205 may be detected by the location/time service module 326.

The location/time service module 326 may be operable to determine location information of a wireless source device such as the wireless source device 190 based on the determined location information and the determined time information of the IP LNB assembly 300, along with a plurality of other location information and a plurality of corresponding other time information associated with a plurality of other IP LNB assemblies 103b, 103c. In this regard, the time information and each of the other time information may be determined based on receiving a corresponding signal from the wireless source device 190. The determined location information of the wireless source device 190 along with other characteristics of the wireless source device 190 may be stored and maintained in the database 332, for example. The database 332 may then be made available to other devices, for example.

Figure 4:
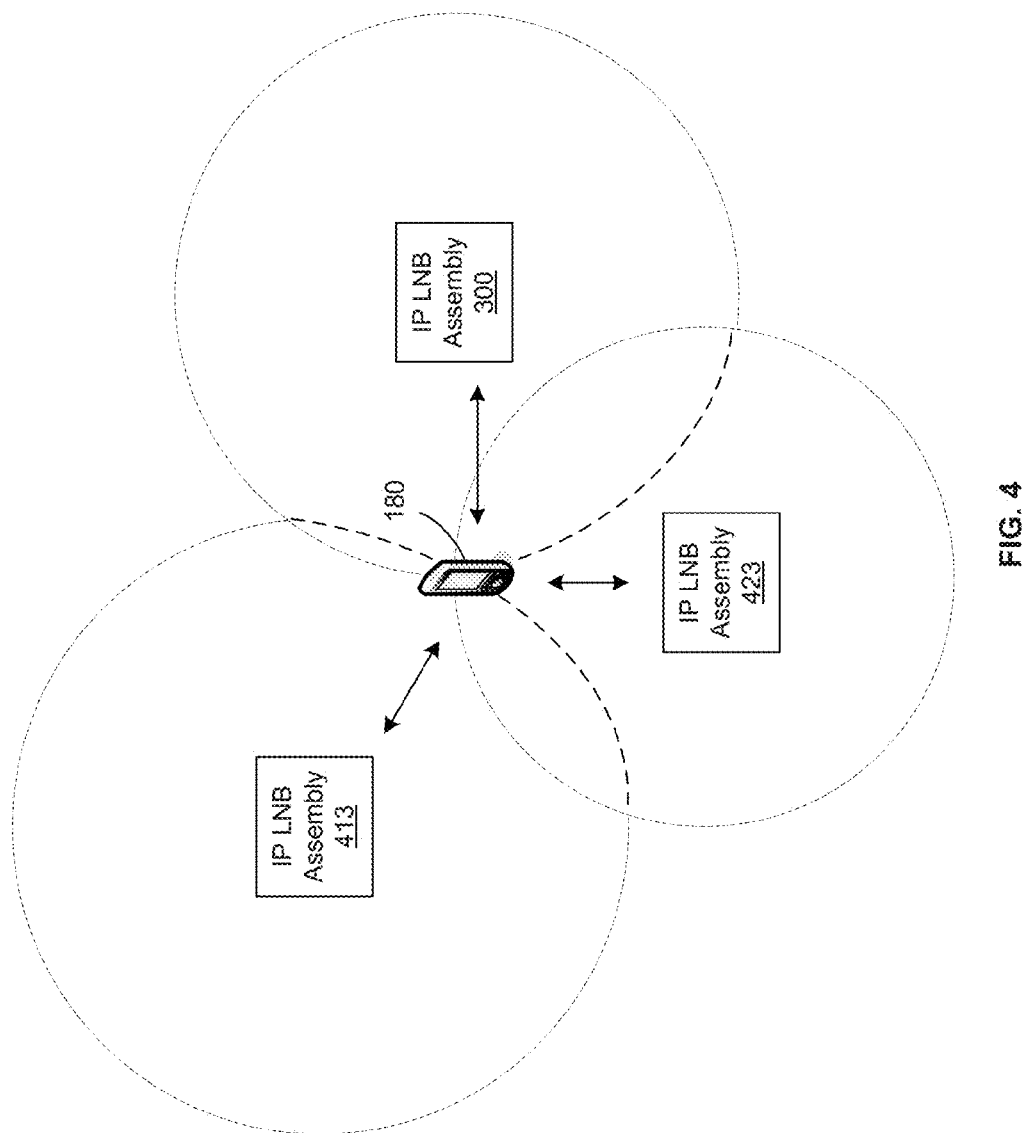
FIG. 4 is a block diagram illustrating an exemplary scenario of an Internet protocol LNB assembly providing location service, in accordance with an embodiment of the invention.

FIG. 4 is a block diagram illustrating an exemplary scenario of an Internet protocol LNB assembly providing location service, in accordance with an embodiment of the invention. Referring to FIG. 4, there is shown the IP LNB assembly 300 and a plurality of other IP LNB assemblies, of which the IP LNB assemblies 413, 423 are illustrated. There is also shown the wireless communication device 180. The wireless communication device 180 may be communicatively coupled to the IP LNB assemblies 300, 413, 423. The IP LNB assembly 300 may be as described with respect to FIG. 3, for example. The wireless communication device 180 may be as described with respect to FIG. 1, for example. The IP LNB assemblies 413, 423 may be substantially the same as the IP LNB assemblies 103b, 103c described with respect to FIG. 1, for example.

In an exemplary operation, each of the IP LNB assemblies 300, 413, 423 may be operable to communicate or send a signal to the wireless communication device 180, where the communicated signals may comprise location information of the corresponding IP LNB assemblies 300, 413, 423 and time stamps of the signals. In this regard, the location information and the time stamp information associated with the IP LNB assembly 300 may be determined, for example, via the GNSS module 320 in the IP LNB assembly 300. Based on the received location information associated with the IP LNB assemblies 300, 413, 423 and the time stamp information of the received signals, the wireless communication device 180 may then be operable to determine or compute its own location information by performing, for example, a trilateration or triangulation process. Since there may be several IP LNB assemblies such as the IP LNB assemblies 300, 413, 423 within a neighborhood, the wireless communication device 180 may utilize signals from a plurality of IP LNB assemblies to more accurately determine its position. The determined location information of the wireless communication device 180 may be communicated to an IP LNB assembly such as the IP LNB assembly 300 for storage. The location/time service module 326 in the IP LNB assembly 300 may then be operable to provide the stored location information of the wireless communication device 180 to other IP LNB assemblies in a region such as the region 170, for example.

Figure 5:
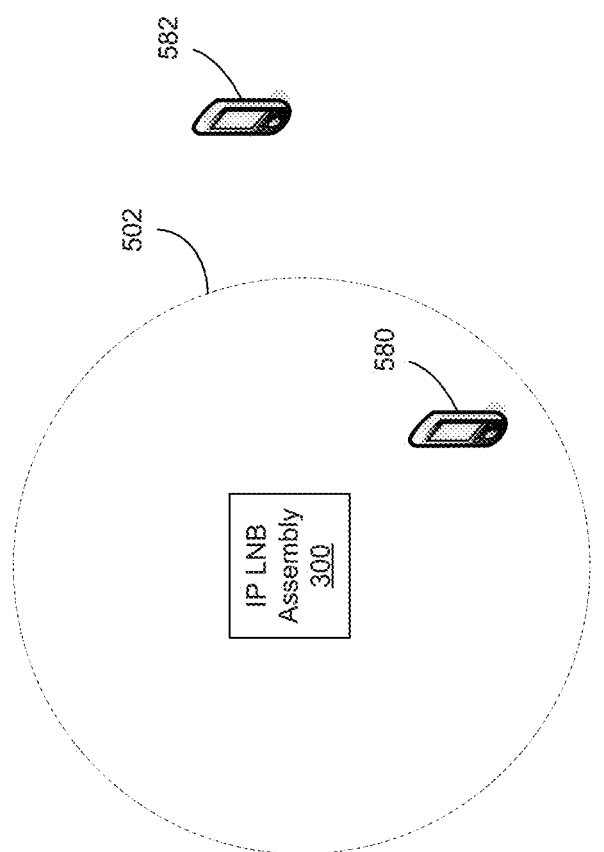
FIG. 5 is a block diagram illustrating an exemplary scenario of an Internet protocol LNB assembly performing digital rights management and/or conditional access, in accordance with an embodiment of the invention.

FIG. 5 is a block diagram illustrating an exemplary scenario of an Internet protocol LNB assembly performing digital rights management and/or conditional access, in accordance with an embodiment of the invention. Referring to FIG. 5, there is shown the IP LNB assembly 300 and wireless communication devices 580, 582. The IP LNB assembly 300 may be as described with respect to FIG. 3, for example. The wireless communication device 580 or the wireless communication device 582 may be substantially the same as the wireless communication device 180 described with respect to FIG. 1, for example.

In an exemplary operation, based on the location information of the IP LNB assembly 300 and the location information of the wireless communication device 580, the location/time service module 326 in the IP LNB assembly 300 may determine or estimate that the wireless communication device 580 may be within a particular range 502 of the IP LNB assembly 300, for example. Similarly, based on the location information of the IP LNB assembly 300 and the location information of the wireless communication device 582, the location/time service module 326 may determine or estimate that the wireless communication device 582 may be beyond the particular range 502 of the IP LNB assembly 300, for example.

The location/time service module 326 may be operable to perform digital rights management (DRM) and/or conditional access (CA) for content delivery to the wireless communication devices 580, 582 based on whether the wireless communication devices 580, 582 are located within or beyond the particular range of the IP LNB assembly 300. In this regard, for example, the wireless communication device 580 may be determined to be within the particular range 502 of the IP LNB assembly 300. The DRM and/or the CA may be granted to the wireless communication device 580 and the wireless communication device 580 may be allowed to access or consume the content, for example. The wireless communication device 582 may be determined to be beyond the particular range 502 of the IP LNB assembly 300, for example. In such an instance, the DRM and/or the CA may not be granted to the wireless communication device 582 and the wireless communication device 582 may be denied access to the content, for example.

Figure 6:
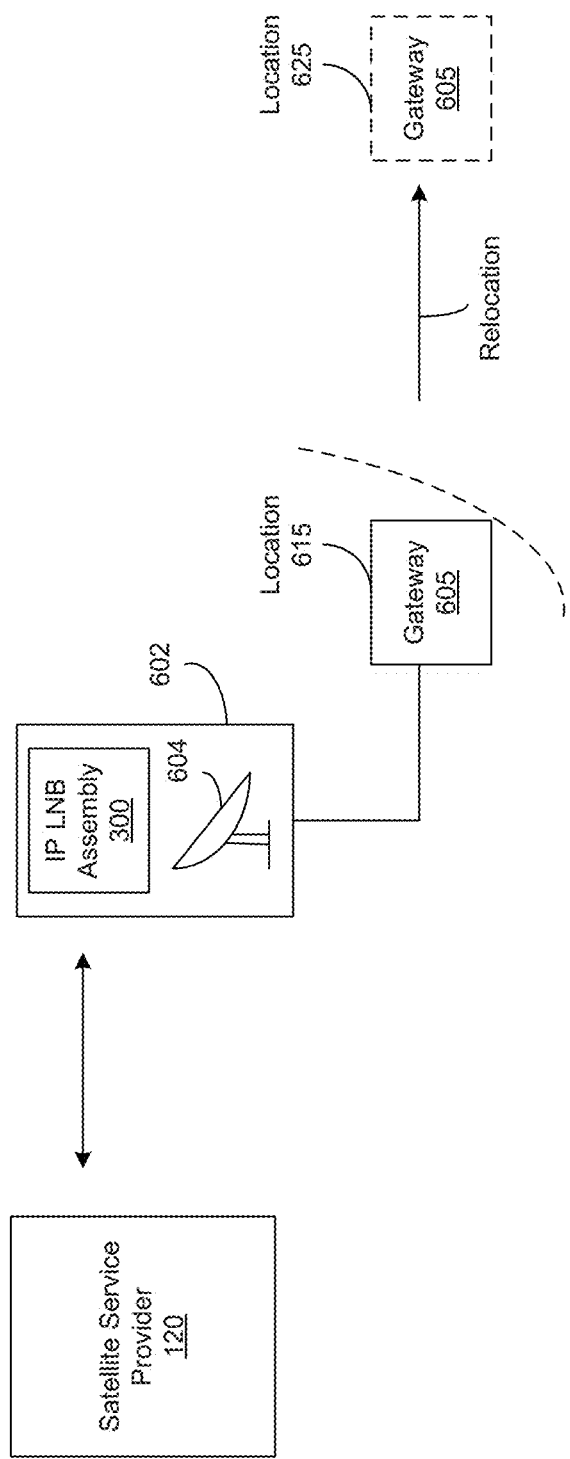
FIG. 6 is a block diagram illustrating an exemplary scenario of an Internet protocol LNB assembly detecting relocation, in accordance with an embodiment of the invention.

FIG. 6 is a block diagram illustrating an exemplary scenario of an Internet protocol LNB assembly detecting relocation, in accordance with an embodiment of the invention. Referring to FIG. 6, there is shown a satellite reception assembly 602 and a gateway 605. The satellite reception assembly 602 may comprise the IP LNB assembly 300 and, for example, a dish 604. The satellite reception assembly 602 may be substantially the same as the satellite reception assembly 202 described with respect to FIG. 2, for example. The IP LNB assembly 300 may be as described with respect to FIG. 3, for example. The dish 604 may be substantially the same as the dish 204 described with respect to FIG. 2, for example. The gateway 605 may be substantially the same as the gateway 205 described with respect to FIG. 2, for example. There is also shown, in FIG. 6, the satellite service provider 120. The satellite service provider 120 may be as described with respect to FIG. 1, for example.

In an exemplary operation, based on the location information of the IP LNB assembly 300 and time stamps information in signals which may be communicated between the IP LNB assembly 300 and the gateway 605, the location/time service module 326 in the IP LNB assembly 300 may be operable to track a location of the gateway 605. In this regard, for example, at a time when the dish 604 and the gateway 605 were installed, a location 615 of the gateway 605 might be determined or estimated by the location/time service module 326 and stored in the memory 304 in the IP LNB assembly 300. In instances when the location/time service module 326 detects that the gateway 605 has been relocated or moved from the installed location 615 to, for example, an unauthorized location 625, the location/time service module 326 may communicate or report the unauthorized relocation of the gateway 605 to the satellite service provider 120. The satellite service provider 120 may then communicate or send a warning message indicating the unauthorized movement of the gateway 605 to a user and/or block all or partial programming, for example. In some instances, the satellite reception assembly 602 and/or the gateway 605 may be rendered inoperable by the satellite service provider 120, for example.

Figure 7:
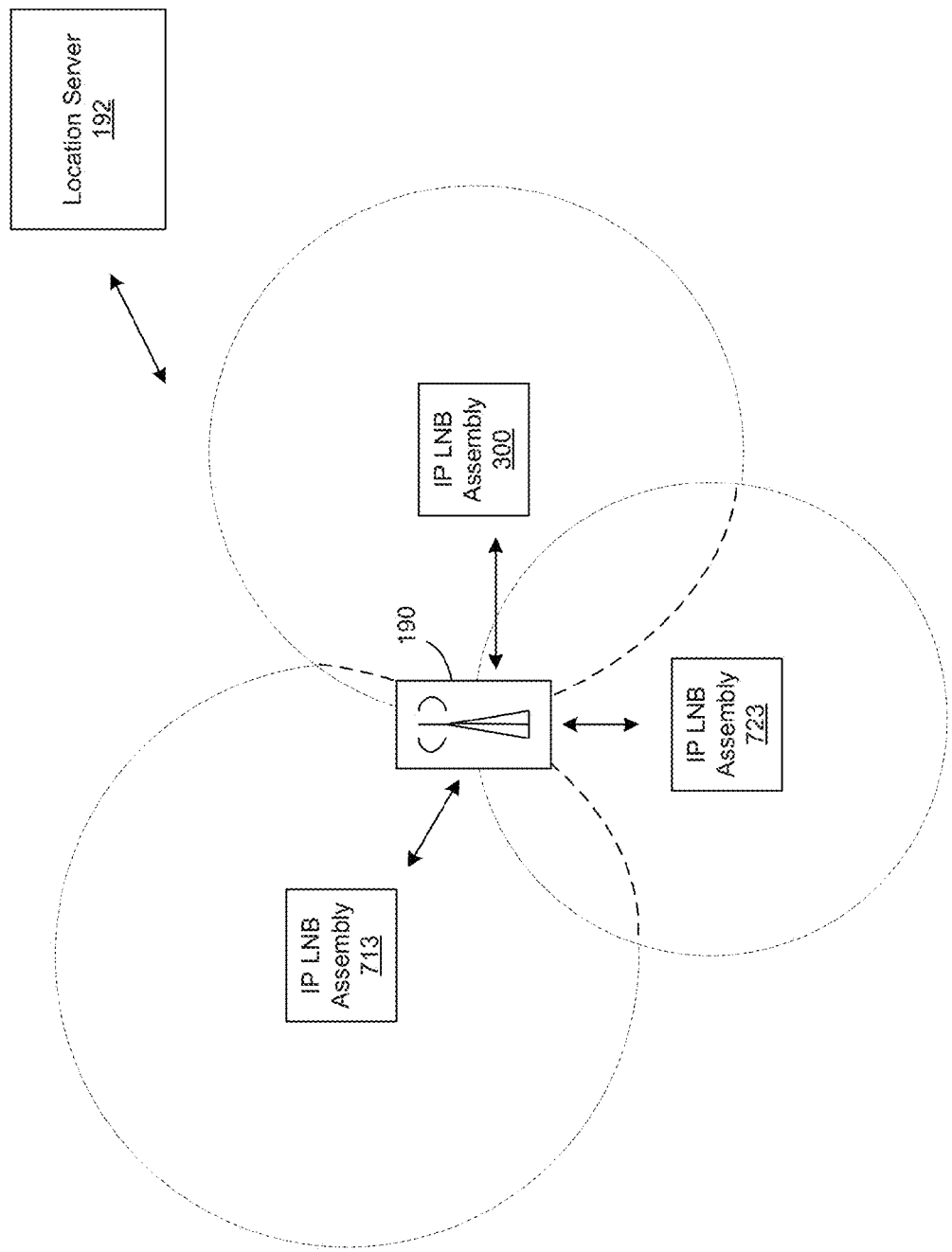
FIG. 7 is a block diagram illustrating an exemplary scenario of an Internet protocol LNB assembly determining location information, in accordance with an embodiment of the invention.

FIG. 7 is a block diagram illustrating an exemplary scenario of an Internet protocol LNB assembly determining location information, in accordance with an embodiment of the invention. Referring to FIG. 7, there is shown the IP LNB assembly 300 and a plurality of other IP LNB assemblies, of which the IP LNB assemblies 713, 723 are illustrated. There is also shown the wireless source device 190 and the location server 192. The IP LNB assembly 300 may be as described with respect to FIG. 3, for example. The wireless source device 190 may be as described with respect to FIG. 1, for example. The IP LNB assemblies 713, 723 may be substantially the same as the IP LNB assemblies 103b, 103c described with respect to FIG. 1, for example. The location server 192 may be as described with respect to FIG. 1, for example. The IP LNB assemblies 713, 723 may be communicatively coupled to the IP LNB assembly 300.

In an exemplary operation, the IP LNB assembly 300 and a plurality of other IP LNB assemblies 713, 723 located in certain proximity may each receive a signal from the wireless source device 190. The received signals may comprise time stamps information of the signals, for example. In such instances, based on determined time information while receiving the signals, a distance between the IP LNB assembly 300 and the wireless source device 190, a distance between the IP LNB assembly 713 and the wireless source device 190, and a distance between the IP LNB assembly 723 and the wireless source device 190 may be computed or estimated. The time of arrival of the received signal may be determined or estimated during processing of the received signal by the IP LNB module 308 in the IP LNB assembly 300, for example.

The location information and the distance information associated with the IP LNB assemblies 300, 713, 723 may then be utilized to determine or compute location information of the wireless source device 190. In this regard, for example, based on the location information and the distance information associated with the IP LNB assembly 300 along with the location information and the distance information associated with the IP LNB assemblies 713, 723, the location/time service module 326 in the IP LNB assembly 300 may be operable to determine or compute the location information of the wireless source device 190, locally. The location information of the wireless source device 190 may be computed by performing, for example, a trilateration or triangulation process. In some instances, the location information of the wireless source device 190 may be determined remotely via, for example, the location server 192. In this regard, the location server 192 may perform the trilateration or the triangulation processing on received location information and distance information associated with the IP LNB assemblies 300, 712, 723 to compute the location information for the wireless source device 190.

As more IP LNB assemblies participate in contributing signals, the accuracy level of the location information obtained from the trilateration or the triangulation processing may increase. The determined location information along with other characteristics (e.g., unprotected WiFi status, frequency offset, transmission frequency, estimated power levels) of the wireless source device 190 may be stored and maintained in the database 332 in the IP LNB assembly 300. In this regard, the database 332 may also store other location information and other characteristics associated with a plurality of other wireless source devices, for example. In such instances, the database 332 may be made available to other devices and/or other databases for the purpose of, for example, determining nearby hotspots positioning, time synchronization, hand-off, frequency allocation, frequency planning, coverage planning and analysis, traffic flow monitoring, as well as confirming device location to a third party for the purposes of security, delivery of location-based services and advertisement, and/or asset tracking.

Figure 8:
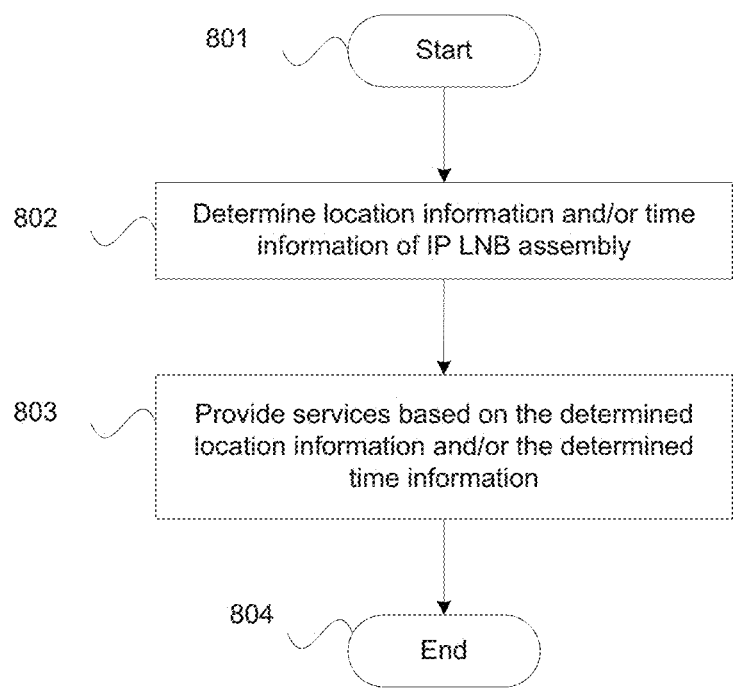
FIG. 8 is a flow chart illustrating exemplary steps for an Internet protocol LNB assembly supporting positioning, in accordance with an embodiment of the invention.

FIG. 8 is a flow chart illustrating exemplary steps for an Internet protocol LNB assembly supporting positioning, in accordance with an embodiment of the invention. Referring to FIG. 8, the exemplary steps start at step 801. In step 802, the processor 302 in the IP LNB assembly 300 may be operable to determine location information and/or time information of the IP LNB assembly 300. The location information and/or the time information may be determined via the GNSS module 320 in the IP LNB assembly 300, for example.

In step 803, the location/time service module 326 in the IP LNB assembly 300 may be operable to provide services based on the determined location information and/or the determined time information. In this regard, for example, the location information and the time information may be communicated to a wireless communication device such as the wireless communication device 180 for determining location information of the wireless communication device 180. For example, the location/time service module 326 may perform digital rights management (DRM) and/or conditional access for content delivery based on the determined location information of the IP LNB assembly 300. The determined time information may be utilized for accurate timing recovery for a region such as the region 170, for example. The determined location information may be utilized for generating a location map for the region 170, for example. The location/time service module 326 may detect relocation or movement of the satellite reception assembly 604 and/or the gateway 605 based on the determined location information of the IP LNB assembly 300, for example. Based on the determined location information, the determined time information and a received signal from a wireless source device such as the wireless source device 190, the location/time service module 326 may be operable to determine or compute location information for the wireless source device 190. The exemplary steps may proceed to the end step 804.

In various embodiments of the invention, an IP LNB assembly such as the IP LNB assembly 300 may be operational within a satellite reception assembly such as the satellite reception assembly 202. A processor 302 in the IP LNB assembly 300 may be operable to determine location information and/or time information of the IP LNB assembly 300. A location/time service module 326 in the IP LNB assembly 300 may be operable to provide services based on the determined location information and/or the determined time information of the IP LNB assembly 300. In this regard, the processor 302 may determine the location information and/or the time information of the IP LNB assembly 300 via, for example, a GNSS module 320 in the IP LNB assembly 300.

The IP LNB assembly 300 may be operable to communicate the determined location information and/or the determined time information to a wireless communication device such as the wireless communication device 180 via, for example, a wireless interface module 314. In this regard, the wireless communication device 180 may be communicatively coupled to the IP LNB assembly 300. In such instances, the wireless communication device 180 may determine location information of the wireless communication device 180, based on the location information and the time information communicated from the IP LNB assembly 300 and on other location information and corresponding other time information communicated from one or more other IP LNB assemblies 413, 423. In this regard, the wireless communication device 180 may also be communicatively coupled to the one or more other IP LNB assemblies 413, 423. The IP LNB assembly 300 may be operable to receive the location information of the wireless communication device 180 from the wireless communication device 180. The received location information of the wireless communication device 180 may then be stored in a memory 304 in the IP LNB assembly 300, for example.

The location/time service module 326 may be operable to perform digital rights management (DRM) and/or conditional access (CA) for content delivery based on the determined location information of the IP LNB assembly 300. The determined time information of the IP LNB assembly 300 may be communicated, by the IP LNB assembly 300, to one or more other IP LNB assemblies such as the IP LNB assemblies 103*b*, 103*c* in a region such as the region 170 for accurate timing recovery for the region 170. Based on the determined location information of the IP LNB assembly 300 along with other location information associated with other IP LNB assemblies 103*b*, 103*c* in the region 170, a location map or grid 182 may be generated by the IP LNB assembly 300 for the region 170.

Based on the determined location information of the IP LNB assembly 300, relocation or move of the satellite reception assembly 602 and/or an associated gateway 605 may be detected by the location/time service module 326. In instances when an unauthorized relocation of, for example, the gateway 605 has been detected, the location/time service module 326 may communicate or report the unauthorized relocation of the gateway 605 to a satellite service provider such as the satellite service provider 120, for example. The satellite service provider 120 may then issue a warning message and/or may terminate all or partial programming services, for example.

The location/time service module 326 in the IP LNB assembly 300 may be operable to determine location information of a wireless source device such as the wireless source device 190, based on the determined location information and the determined time information of the IP LNB assembly 300 along with a plurality of other location information and a plurality of corresponding other time information associated with a plurality of other IP LNB assemblies 713, 723. In this regard, the plurality of other IP LNB assemblies 713, 723 may be communicatively coupled to the IP LNB assembly 300. The time information and each of the other time information may be determined based on receiving a corresponding signal from the wireless source device 190. The location/time service module 326 may determine the location information of the wireless source device 190 locally and/or remotely via a location server such as the location server 192, for example.

The determined location information of the wireless source device 190 along with other characteristics of the wireless source device 190 may be stored and maintained in a database 332 in the IP LNB assembly 300, for example. The database 332 may also store and maintain other location information and other characteristics information associated with a plurality of other wireless source devices, for example. In this regard, the database 332 may be made available to other devices and/or other databases for various purposes. For example, the database 332 may be utilized by a third party, in real-time or at some later time, to verify a position or location of a particular wireless source device. This may be useful for secure transactions, user identification, conditional access, estimating traffic and its flow, delivering precise and timely location-based information and services, and/or other types of transactions, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for an Internet protocol LNB supporting positioning.

Accordingly, aspects of the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method, comprising:
   determining in an Internet protocol low noise block downconverter (IP LNB) that is within a satellite reception assembly, location information and corresponding time information of the IP LNB;
   determining location information of a wireless source device based on the determined location information and the corresponding time information of the IP LNB along with a plurality of other location information and corresponding other time information associated with a plurality of other IP LNB assemblies; and
   communicating the determined location information and the corresponding time information to a wireless communication device communicatively coupled to the IP LNB;
   wherein:
      the location information is configured to enable the wireless communication device to determine its location based on the determined location information and the corresponding time information;
      the plurality of other IP LNB assemblies are communicatively coupled to the IP LNB; and
      the time information and each of the other time information are determined based on receiving a corresponding signal from the wireless source device.

2. The method of claim 1, comprising determining the location information and/or the time information of the IP LNB based on global navigation satellite system (GNSS) signals.

3. The method of claim 2, comprising receiving and/or processing the global navigation satellite system (GNSS) signals by the IP LNB.

4. The method of claim 1, comprising:
   receiving the location information of the wireless communication device from the wireless communication device; and
   storing the received location information of the wireless communication device.

5. The method of claim 1, comprising communicating the determined time information to one or more other IP LNB assemblies for accurate timing recovery.

6. The method of claim of 1, comprising providing services based on the determined location information and the corresponding time information.

7. The method of claim 1, comprising applying digital rights management (DRM) and/or conditional access (CA) for content delivery based on the determined location information of the IP LNB.

8. The method of claim 1, comprising generating a location map for a region based on the determined location information of the IP LNB along with other location information associated with other IPLNB assemblies.

9. The method of claim 1, comprising detecting relocation of the satellite reception assembly and/or an associated gateway based on the determined location information of the IP LNB.

10. A system, comprising:
    an Internet protocol low noise block downconverter (IP LNB) within a satellite reception assembly, wherein the IP LNB comprises at least one processing circuit for processing data and at least one communication circuit for use in support of communication of signals, the IP LNB being operable to:
       determine location information and corresponding time information of the IP LNB; and
       determine location information of a wireless source device based on the determined location information and the corresponding time information of the IP LNB along with a plurality of other location information and a plurality of corresponding other time information associated with a plurality of other IP LNB assemblies; and
       communicate the determined location information and the corresponding time information to a wireless communication device communicatively coupled to the IP LNB; and
    wherein:
       the determined location information is configured to enable the wireless communication device to determine its location based on the determined location information and the corresponding time information;
       the plurality of other IP LNB assemblies are communicatively coupled to the IP LNB; and
       the time information and each of the other time information are determined based on receiving a corresponding signal from the wireless source device.

11. The system of claim 10, wherein the IP LNB is operable to determine the location information and/or the time information of the IP LNB based on global navigation satellite system (GNSS) signals.

12. The system of claim 11, wherein the IP LNB is operable to receive and/or process the global navigation satellite system (GNSS) signals.

13. The system of claim 10, wherein the IP LNB is operable to:
    receive the location information of the wireless communication device from the wireless communication device; and
    store the received location information of the wireless communication device.

14. The system of claim 10, wherein the IP LNB is operable to communicate the determined time information to one or more other IP LNB assemblies for accurate timing recovery.

15. The system of claim 10, wherein the IP LNB is operable to provide services based on the determined location information and the corresponding time information.

16. The system of claim 10, wherein the IP LNB is operable to apply digital rights management (DRM) and/or conditional access (CA) for content delivery based on the determined location information of the IP LNB.

17. The system of claim 10, wherein the IP LNB is operable to generate a location map for a region based on the determined location information of the IP LNB along with other location information associated with other IPLNB assemblies in the region.

18. The system of claim 10, wherein the IP LNB is operable to detect relocation of the satellite reception assembly and/or an associated gateway based on the determined location information of the IP LNB.

\* \* \* \* \*